April 24, 1945.   M. L. HARBAUGH   2,374,285
MANUFACTURE OF ANHYDROUS SODIUM SULPHATE
Filed Sept. 19, 1942
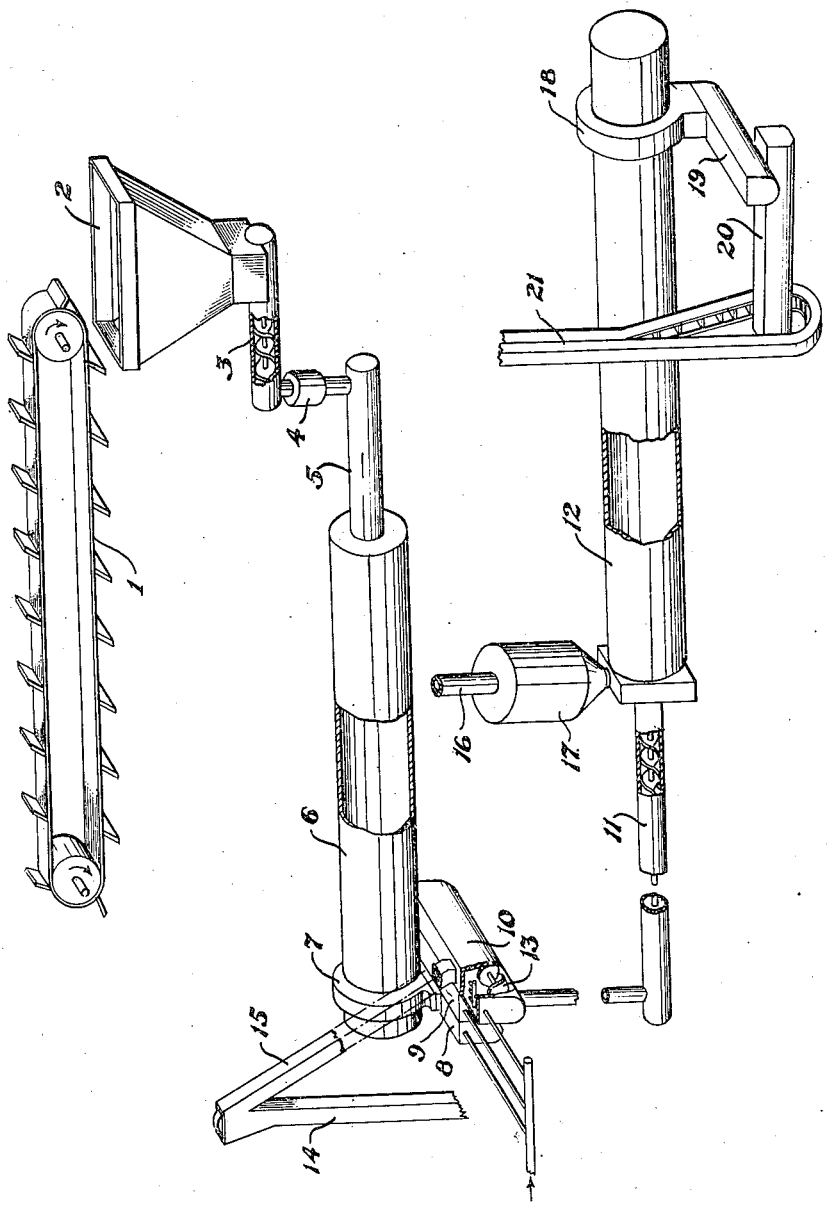
Max L. Harbaugh INVENTOR
BY
George T. Jeanmussen
ATTORNEY Patented Apr. 24, 1945

2,374,285

UNITED STATES PATENT OFFICE 2,374,285

MANUFACTURE OF ANHYDROUS SODIUM SULPHATE

Max L. Harbaugh, Cleveland, Ohio, assignor to E. I. du Pont de Nemours & Company, Wilmington, Del., a corporation of Delaware Application September 19, 1942, Serial No. 458,946

6 Claims. (Cl. 23—121)

This invention relates to the manufacture of salt cake and is particulary directed to the production of a non-caking product by calcining a mixture of sodium bisulphate and sodium chloride in proportions to provide an essentially neutral sodium sulphate, cooling the product to a temperature below the Thenardite transition whereby a metastable polymorphic form of sodium sulphate is obtained, and transforming said metastable polymorphic form of sodium sulphate to Thenardite by aging the cooled product in the presence of water.

Salt cake is a form of anhydrous sodium sulphate obtained as a by-product in the manufacture of hydrochloric acid in accordance with the following equations:

I. $NaCl + H_2SO_4 \rightarrow NaHSO_4 + HCl$
II. $NaCl + NaHSO_4 \rightarrow Na_2SO_4 + HCl$

The first of these reactions proceeds very readily and is usually carried out in a heated reaction vessel, commonly known as the pot. Ordinarily 2 mols of salt are added for each mol of sulphuric acid, and under the influence of strong heating the Reaction II may be caused to proceed to a considerable extent so that there is obtained a mixture of sodium chloride and sodium bisulphate with or without a substantial amount of sodium sulphate. This mixture of sodium chloride and sodium bisulphate is then subjected to calcination whereupon Reaction II takes place, freeing hydrochloric acid and leaving salt cake as the product. The salt cake is discharged at a high temperature, say between about 800 and 1200° F., to primary storage where it is allowed to cool. It is then ground and screened for shipment according to customer's specifications.

Salt cake produced according to the prior art methods was characterized by a tendency to cake up during storage. Since this caking tendency was not observed in the case of recrystallized sodium sulphate it was thought that caking was due to the impure nature of the salt cake. Impurities such as unreacted acid or unreacted salt were thought to be responsible for these caking tendencies. However, the prior art was not apprised of any method of satisfactorily eliminating these caking tendencies and of consequence salt cake was at an economic disadvantage as compared with anhydrous sodium sulphate from natural sources.

I have now discovered the true cause of these caking tendencies of salt cake and have provided means for eliminating them. I have discovered that the caking tendencies are not associated with excess acidity or excess sodium chloride but to an entirely different and heretofore unsuspected cause. Thus I have found that the caking tendency in salt cake is due to polymorphic transitions and that the caking tendency can be eliminated by treating the salt cake to convert it to a stable form. Thus I have found that by cooling the salt cake to a temperature below the Thenardite transition, then treating it to convert it to Thenardite, substantially all tendency to cake during storage in packages or bins is eliminated.

The existence of polymorphism of sodium sulphate has been amply demonstrated by Kracek and his co-workers, Journal of Physical Chemistry, volume 34, pp. 1741–1744 (1930). Kracek by X-ray analysis proves the existence of three forms: $Na_2SO_4$ I, $Na_2SO_4$ III, and $Na_2SO_4$ V (Thenardite). $Na_2SO_4$ I is the form stable at high temperatures, $Na_2SO_4$ III the form stable between about 365° F. and 464° F., and $Na_2SO_4$ V (Thenardite) is stable at temperatures below about 365° F. Kracek also observed two other forms, namely, $Na_2SO_4$ II and $Na_2SO_4$ IV, under certain conditions, but the existence of these forms were not confirmed by X-ray analysis. Kracek also observed that $Na_2SO_4$ III remained in a metastable condition at temperatures below about 365° F. and discusses the influence of moisture and sulphuric acid in promoting the Thenardite transition, that is, the transition of $Na_2SO_4$ III to $Na_2SO_4$ V.

It has not been known heretofore, however, that these polymorphic transitions had anything to do with the caking tendencies of salt cake, and for more than a decade it has not occurred to those skilled in the art confronted with the problem. Those skilled in the art have not heretofore understood the cause of the caking tendencies of salt cake and in consequence the scientific information accumulated by Kracek has remained without practical or economic significance in the art and has afforded no clue to the solution of the problem of caking tendencies in salt cake.

I have now found the primary reason for these caking tendencies in salt cake is due to the polymorphic transitions which take place in the cooling of the salt cake from furnace temperatures. Thus the salt cake as it is discharged from the furnace, being at temperatures above 464° F., consists of $Na_2SO_4$ I. When the material is placed in primary storage above this temperature and allowed there to cool transition from $Na_2SO_4$ I to $Na_2SO_4$ III takes place causing coalescence and agglomeration in the new crystals formed. Thus the product cakes into large hard masses which are difficult to disintegrate in the preparation of the product for shipment. This tendency to cake in the primary storage can be avoided by cooling the salt cake under conditions of mild agitation to a temperature below the $Na_2SO_4$ III transition before it is deposited in storage bins or piles. Such agitation as provided by bucket elevators, drag conveyors, hoppers, screw conveyors and the like are usually adequate to prevent coalescence and agglomeration of the newly formed crystals as a result of the allotropic transition.

However the salt is cooled and irrespective of whether caking in the primary storage is involved or not, caking in the secondary storage, that is, in the barrels, cars or other containers in which the product is packed for shipment, or in the storage bins of the user, almost invariably results. When salt cake in the form $Na_2SO_4$ III is exposed to the atmosphere it picks up moisture. The presence of sulphuric acid in the salt cake increases the amount of moisture picked up or the rate with which it is picked up. This moisture pick-up promotes the Thenardite transition which is apparently responsible for the caking in storage. X-ray analyses and heat of solution determinations have shown that the major portion of the salt cake in primary storage is in the form $Na_2SO_4$ III. Upon pick-up of water from the atmosphere or on mixing with wet material the transition to $Na_2SO_4$ V occurs. The heat of transition (700 calories/g.m.) causes a temperature rise in the order of 20° C. if the material is so insulated that heat losses do not occur. The transition is thought to take place through the medium of nuclei of $Na_2SO_4$ V deposited from solution of $Na_2SO_4$, and the severe caking which results may be explained either by the recrystallization of the salt cake in the new crystal form or by the formation of some one of various hydrates to act as a bonding agent. $Na_2SO_4$ V when once formed is less readily soluble than $Na_2SO_4$ III and has less tendency to form hydrates. It can be maintained wet at room temperature for indefinite periods without forming hydrate, provided, of course, that only relatively small percentages of water, say around 2%, are involved. By keeping the salt cake in a state of mild agitation during the Thenardite transition, that is, the transition from $Na_2SO_4$ III to $Na_2SO_4$ V, secondary caking in the packed or stored product is eliminated.

Thus, according to my invention the hot salt cake is cooled preferably with agitation through the $Na_2SO_4$ III transition to a temperature below the Thenardite transition and with agitation in the presence of water during the Thenardite transition. By observing these simple precautions a product free of the tendency to cake is produced.

My invention may be more fully understood by reference to the accompanying drawing in which apparatus suitable for carrying out the processes of my invention is diagrammatically illustrated.

Salt cake substantially at the temperature discharged from the furnace and at a temperature above the $Na_2SO_4$ III transition point is charged to a conveyor system including the drag conveyor 1 which transfers it to the storage bin 2 which is essentially a large hopper having suitable discharge means, such as the screw feeder 3. The feed screw 3 feeds salt cake to a suitable mechanism represented at 4 for eliminating oversize. This mechanism may be either a crusher or screening device, or both. The material is then fed by the screw feeder 5 into a rotary cooler 6. The cooled salt cake is then discharged from the rotary cooler by the discharge mechanism 7 into the soakers 8, 9 and 10. These soakers are provided with feed screws 13 to move the material from one end to the other. At the near end the material is kicked from soaker 8 into soaker 9, and at the far end from soaker 9 into soaker 10; and at the near end of soaker 10 it is discharged into a screw feeder 11 and then into a rotary drier 12.

The three soakers 8, 9 and 10 are provided with spray heads adapted to atomize a fine mist of water over the surface of the material being agitated therein. They are also provided with suitable means, including the elevator 14 and chute 15 which communicates with soaker 10 for introducing alkali such as sodium carbonate in case it is desired to neutralize any excess acidity the salt cake may have. The rotary drier 12 is internally fired, and the hot combustion gases before passing to the stack 16 pass through the dust catcher 17 to arrest any sodium sulphate which might otherwise pass out as fume or dust. The salt cake is discharged from the rotary drier 12 at a discharge means 18 into the screw conveyors 19 and 20 whence it is taken by the elevator 21 to storage or packaging devices.

In operation the salt cake cools off very rapidly to a temperature below the $Na_2SO_4$ III transition point. Thus the salt cake, which is discharged from the furnace at a temperature of about 900° F., in its passage to the hopper 2 may become cooled below the $Na_2SO_4$ III transition point so that primary caking which might otherwise occur in the hopper 2 is avoided. Should the material not be kept in a state of agitation through this transition point slight modifications in the requirements for handling the salt cake and a larger capacity crusher would be required. In the rotary cooler 6 the salt cake is cooled down to a temperature well below the Thenardite transition point. It must be cooled sufficiently to pick up and retain moisture in the soakers 8, 9 and 10; cooling to a temperature less than 212° F. will ordinarily be sufficient. Some cooling may be effected by the evaporation of water in the soakers. The soakers 8, 9 and 10 together with the screw conveyor 11 are of sufficient extent to provide agitation throughout the Thenardite transition period. Agitation for a period of 15 minutes ordinarily will be sufficient provided the salt cake has a high conversion factor, and of course longer periods may be used if required.

While I have described my invention with reference to particular apparatus and particular operations it will be understood that substantial variation therefrom may be made without departing from the spirit and scope of the invention, provided only that the salt cake after being cooled through the Thenardite transition point is subjected to aging in the presence of moisture to promote the Thenardite transition and is not packaged for shipment to the consumer until after the aging is substantially complete.

In accordance with a preferred form of my invention I subject the material to agitation during the Thenardite transition and thereby prevent formation of agglomerates which would otherwise have to be broken up before packaging. When I speak of agitation it will be understood that the degree of agitation required to prevent caking during transition from one form to another is very slight. Any degree of agitation will accomplish in part, at least, this object of the invention and in many cases almost imperceptible movement will impart a sufficient degree of agitation to prevent substantial caking. The degree of agitation provided by elevators, conveyor belts, screw conveyors, screens, crushers, vibratory feeders and like mechanism is generally satisfactory.

In the broader aspects of my invention agitating during the Thenardite transition becomes less significant and may be omitted entirely because the transition proceeds entirely independently of agitation and what caking may result due to lack of agitation may be eliminated by milling or other processing prior to packaging. Milling and screening or other means of eliminating oversize will ordinarily be used anyway, but in the absence of agitation more milling capacity is required. The need for agitation to prevent caking may also be eliminated by the provision of quench cooling, that is to say, by effecting the Thenardite transition in the presence of an adequate quantity of saturated sodium sulphate liquor. Even so, agitation during the transition is desirable to check undesirable crystal growth and agglomeration.

The salt cake cooled to below the Thenardite transition point may be exposed to moisture in any of a number of ways. Thus it may be sprayed on the salt cake or it may be condensed on the salt cake from steam. Alternatively the hot salt cake may be quenched in a suitable aqueous medium, such as water or an aqueous solution of sodium sulphate. Such a quenching medium would ultimately become saturated with sodium sulphate so that the quench would actually be a saturated solution of sodium sulphate.

The amount of water required to effect the Thenardite transition is small and any quantity which is added will accomplish in some measure at least the objects of the invention. Because of the mechanical difficulties of obtaining uniform distribution of very small quantities of water it is desirable to keep the amount of water at least as high as about 2% and because of the cost of evaporating water in the drying step it is desirable to keep the amount less than about 5%. Any greater amount may be used which does not excessively dissolve the sulphate. Such dissolving action may also be minimized by using a saturated sodium sulphate solution and if such is used, as in quench cooling, there is no limit other than physical to the amount of water.

The treated salt cake should be dried down to less than 0.5% moisture since damp salt cake has a tendency to pack in storage and a tendency to cause blockage of screens used in sizing the material for packaging. It should be dried sufficiently to accomplish these objects, and ordinarily if dried to a moisture content less than about 0.5% it will be satisfactory.

The time required for converting $Na_2SO_4$ III to Thenardite is ordinarily about 15 minutes for normal salt cake. Should, however, the calcination be effected at too high temperature for too long a time a slow converting salt cake may result. In such case a longer time will be required to effect conversion. Both temperature and time of calcination are involved. Below a certain temperature which is not well established the salt cake may be calcined indefinitely without slowing up the rate of transition from $Na_2SO_4$ III to Thenardite. For example, calcination at a furnace temperature of 1000° F. and a salt cake temperature of 850° F. for a period of 21 hours has failed to show any slowing up of the rate of transition. The minimum salt cake temperature at which the convertibility of the salt cake is impaired appears to be in the neighborhood of 1100–1200° F. for a calcination period of about one hour.

It does not necessarily follow, however, that heating above this temperature will impair the convertibility of the salt cake, but for uniform and consistent results it is best to avoid calcination at a temperature in excess of 1200° F. since otherwise the $Na_2SO_4$ III may be stabilized and the rate of transition to Thenardite materially reduced.

In the broader aspects of my invention conversion of the $Na_2SO_4$ III to Thenardite may be effected by natural aging. Thus, if the salt cake is subjected to atmospheric conditions, it will pick up water and if adequately exposed for sufficient time will convert to Thenardite. Free acid in the salt cake accelerates water pick-up and hastens the transition. The product when so conditioned when milled and screened will retain its free-flowing character.

Once the salt cake is adequately transformed to Thenardite it is milled if necessary, screened and classified, or otherwise treated to remove oversize, and stored or packaged for shipment. It may be packaged in barrels, or bags but in most cases where large quantities are involved it is packaged in box cars. Thus conditioned it may be subjected to conditions of high humidity without severe caking. The essential thing is to substantially complete the Thenardite transition before the product is shipped to the user. Otherwise caking in the shipping container in which it is packaged (barrels, bags or box cars) or in the storage bins of the user is likely to occur.

Other adverse factors which might have a tendency to promote caking such as excess sulphuric acid can be remedied concurrently with the effecting of the Thenardite transition. Soda ash, for example, may be added either before or after, or during the addition of water to promote the Thenardite transition.

I claim:

1. In the manufacture of anhydrous sodium sulphate the steps of forming sodium sulphate by calcining a mixture of sodium bisulphate and sodium chloride in substantially equivalent amounts at a temperature at which $Na_2SO_4$ I is stable and below about 1200° F., cooling the product through the Thenardite transition point while effecting agitation during the $Na_2SO_4$ III transition, effecting substantially complete transition to Thenardite by aging in the presence of added water under such conditions that the water does not substantially hydrate the Thenardite, and then packaging the product.

2. In the manufacture of anhydrous sodium sulphate the steps of forming sodium sulphate by calcining a mixture of sodium bisulphate and sodium chloride in substantially equivalent amounts while maintaining the temperature of calcination below about 1200° F. and such that a substantial quantity of $Na_2SO_4$ I is formed, cooling the product to a temperature below the $Na_2SO_4$ III transition point while effecting agitation, further cooling the product to a temperature below the Thenardite transition point, incorporating water in the product in an amount sufficient to effect transition from $Na_2SO_4$ III to Thenardite but insufficient to substantially hydrate Thenardite, aging in the presence of the water to effect the Thenardite transition, effecting agitation of the product during the aging, and then drying the product.

3. In a process for producing free-flowing, non-caking anhydrous sodium sulphate from salt cake the steps of cooling the salt cake from a temperature at which $Na_2SO_4$ I is stable to a temperature below the Thenardite transition point whereby a product containing a substantial quantity of Na$_2$SO$_4$ III is formed, incorporating water in said product as required to effect conversion of the Na$_2$SO$_4$ III to Thenardite but insufficient to substantially hydrate the Thenardite, effecting agitation during the Thenardite transition, and then drying the product.

4. In a process for producing free-flowing, non-caking anhydrous sodium sulphate from salt cake the steps of cooling the salt cake from a temperature at which Na$_2$SO$_4$ I is stable to a temperature below the Thenardite transition point whereby a product containing a substantial quantity of Na$_2$SO$_4$ III is formed, incorporating in said product about 2–5% water, agitating the product in the presence of the water during the Thenardite transition, and then drying and packaging the product.

5. In the manufacture of free-flowing, non-caking sodium sulphate from salt cake the steps of cooling the salt cake from a temperature at which Na$_2$SO$_4$ I is stable to a temperature such that water can be sprayed on it without excessive vaporization whereby a product containing a substantial quantity of Na$_2$SO$_4$ III is formed, incorporating in the product between about 2 and about 5% water while effecting agitation as required to transform Na$_2$SO$_4$ III to Thenardite, drying the product to less than about 0.5% water, and packaging the dry product.

6. In the manufacture of anhydrous sodium sulphate the steps of forming sodium sulphate by calcining a mixture of sodium bisulphate and sodium chloride in substantially equivalent amounts under conditions such that substantial quantities of Na$_2$SO$_4$ I are formed, cooling the product thus obtained while it is being agitated through the Na$_2$SO$_4$ III transition point to a temperature at which Thenardite is the stable form whereby a product containing a substantial quantity of Na$_2$SO$_4$ III is formed, converting the product thus obtained to Thenardite by adding a relatively small amount of water, insufficient to substantially hydrate the Thenardite, while agitating in the presence of the water, and thereafter drying the product to about 0.5% water.

MAX L. HARBAUGH.